O. P. EDWARDS.
SPRING SUSPENSION FOR AUTOMOBILES.
APPLICATION FILED JUNE 5, 1916.
1,230,466.
Patented June 19, 1917.
2 SHEETS—SHEET 1.
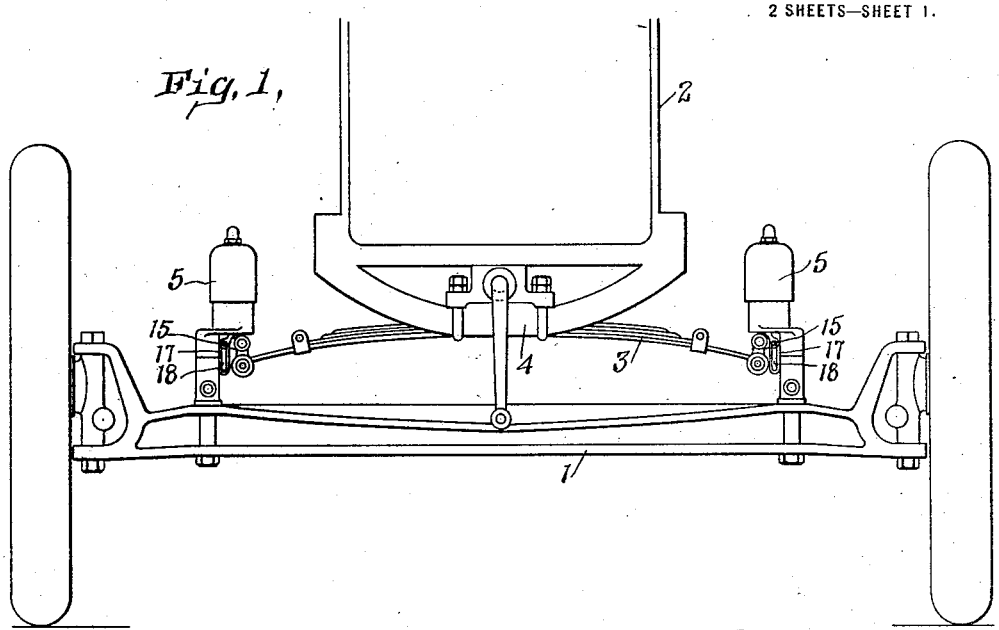
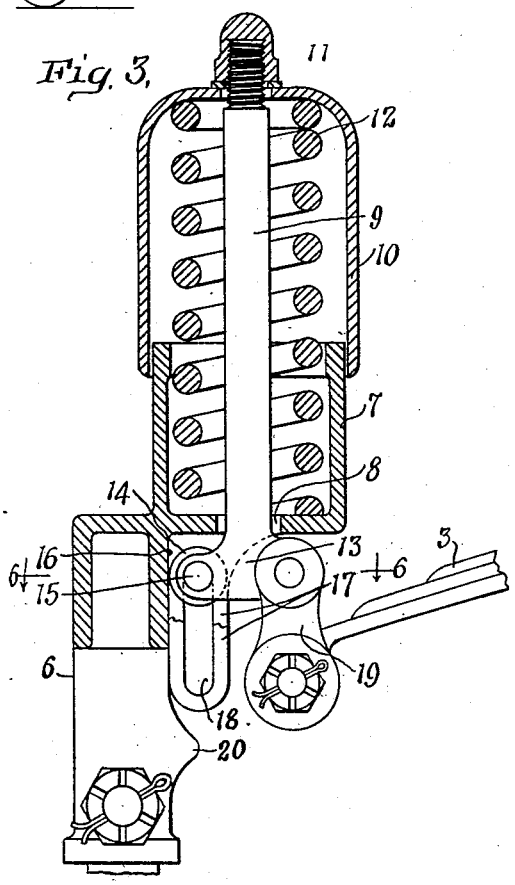
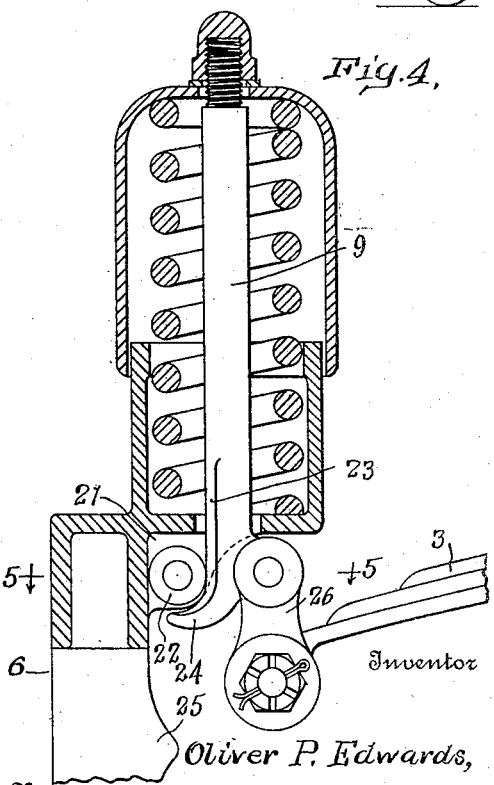
Inventor
Oliver P. Edwards,
By Toulmin & Toulmin,
Attorneys O. P. EDWARDS.
SPRING SUSPENSION FOR AUTOMOBILES.
APPLICATION FILED JUNE 5, 1916.
1,230,466.
Patented June 19, 1917.
2 SHEETS—SHEET 2.
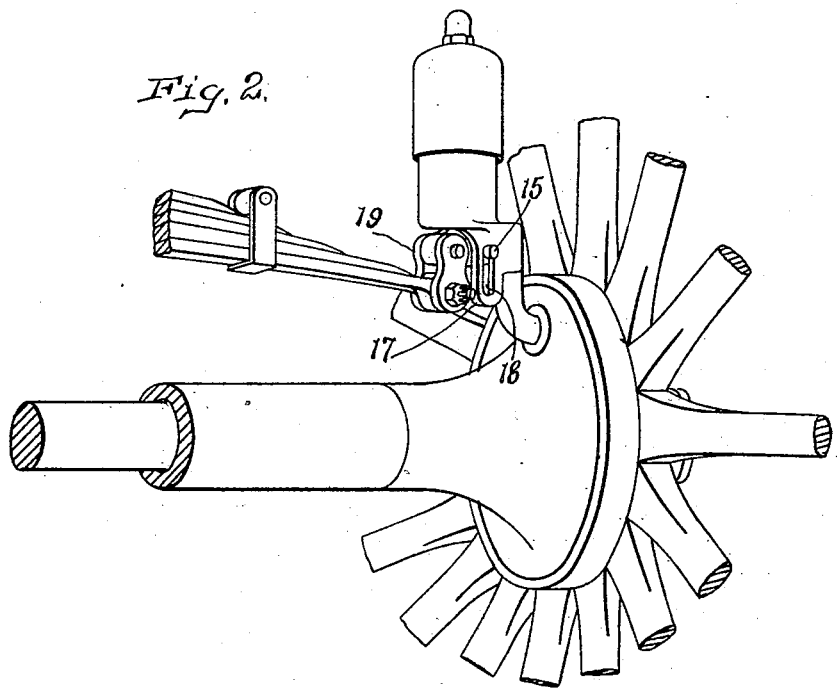
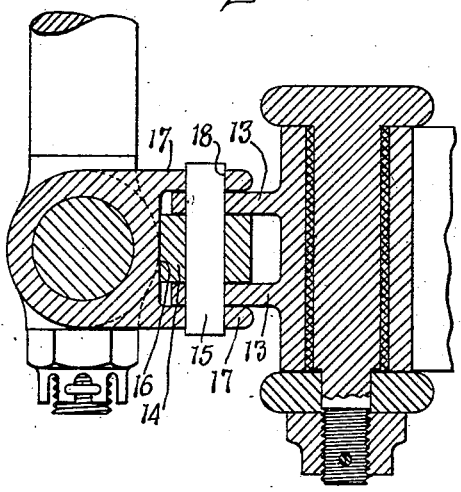
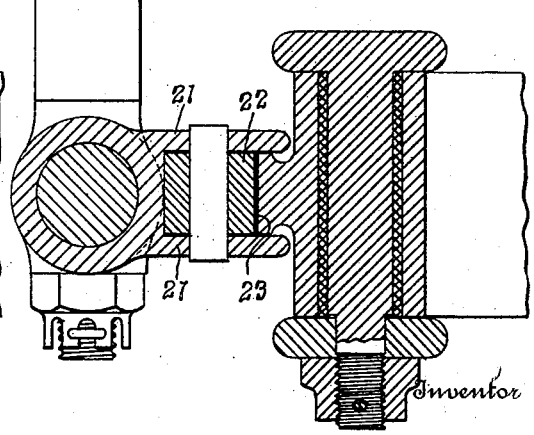
Oliver P. Edwards,

UNITED STATES PATENT OFFICE.

OLIVER P. EDWARDS, OF LEIPSIC, OHIO, ASSIGNOR TO THE TEMCO ELECTRIC MOTOR COMPANY, OF LEIPSIC, OHIO, A CORPORATION OF OHIO.

SPRING SUSPENSION FOR AUTOMOBILES.

1,230,466.  Specification of Letters Patent.  Patented June 19, 1917.

Application filed June 5, 1916. Serial No. 101,778.

*To all whom it may concern:*

Be it known that I, OLIVER P. EDWARDS, a citizen of the United States, residing at Leipsic, in the county of Putnam and State of Ohio, have invented certain new and useful Improvements in Spring Suspensions for Automobiles, of which the following is a specification, reference being had therein to the accompanying drawing.

My invention relates to a spring suspension for automobiles, and is in the nature of an improvement upon the device shown and described in Letters Patent No. 1,072,791, granted to Ralph P. and William S. Thompson Sept. 9th, 1913.

The object of my invention is to provide a shock-absorbing attachment to be used in connection with the existing spring suspension of an automobile.

Another object of this invention is to provide the spring-supported hanger of an automobile shock absorber with an anti-friction roller, whose office is to guide the hanger in its reciprocating movement with the least wear, due to friction, and without the necessity of lubrication.

It is a further object of my invention to limit the extreme movement, in either direction, of this hanger.

In the accompanying drawings, Figure 1 is a front elevation of an automobile showing the application of my shock absorbing device thereto; Fig. 2 is a perspective showing the application of the device to the rear axle; Fig. 3 is a sectional view of one form of shock absorber; Fig. 4 is a sectional view of a modified form; Fig. 5 is a section on the line 5 5 of Fig. 4, looking in the direction of the arrows; and Fig. 6 is a section on the line 6 6 of Fig. 3, looking in the direction of the arrows.

Referring to Fig. 1 I have there shown a non-rotatable axle 1, and a body 2 of an automobile. In usual constructions of this kind there is provided a leaf spring 3 having its central portion fixed to the body 2, as indicated at 4. The ends of the leaf spring are connected to shock absorbers 5 which may comprise either the form shown in Fig. 3 or the form shown in Fig. 4. The first form comprises a vertically extending stem 6 constituting the fixed member of the shock absorber which is to be fixed to the axle and this stem is provided at its upper portion with a cup-shaped casing portion 7 provided with an opening 8 at the bottom thereof, through which extends the movable member or hanger 9 which is provided at its upper portion with a cap portion 10 adapted to telescope the portion 7 and fixed to the stem at 11. The portions of the casing 7 and 10 constitute seats or abutments between which is interposed a coiled spring 12 which normally tends to hold the movable member in raised position. The portion of the hanger 9 extending through the opening 8 is provided with ears 13 upon the inside of which is pivoted an antifriction roller 14 by means of a pivot pin 15 which projects beyond each side thereof. The roller 14 is adapted to engage a vertically extending portion 16 of the member 6. Vertical, spaced-apart guides 17 are also provided to retain the roller 14 in proper engagement with the surface 16 and to prevent wabbling. These guides are each provided with an elongated inclosed slot 18 into which the extending portions of the pin 15 project. The inner portion of the lug 13 has pivoted to it a link 19, to the lower end of which is attached the end of the leaf spring 3 above mentioned. The member 6 below the guide 17 is provided with a rib 20 which acts as a buffer to prevent the wearing of the member 6 as the lower portion of the link and the spring attached thereto comes into engagement therewith. As is clearly shown in Fig. 1, there is a shock absorber of the nature above described on each end of the axle and the ends of the leaf spring are attached to these. When the leaf spring extends or becomes elongated it will be seen that a force will be exerted against the vertical surface 16. This vertical surface prevents the relatively movable members from moving out of alinement with each other and at the same time the friction due to the relatively vertical movement of the parts is reduced to a minimum.

The opening 8 is of greater diameter than the hanger 9 so that there will be no binding of the parts at this point and the guiding devices maintain the hanger spaced from the wall of the stanchion or portion 7 during the reciprocation of the hanger in the opening.

In Fig. 2 I have shown the application of my shock absorber to the rear axle of a wheel. The shock absorber shown is the same as that described in connection with Fig. 3. It will be seen that these devices can be readily applied to existing constructions of an automobile without the necessity of modification of parts or a change of relations of the existing parts of an automobile and they can be easily and readily applied to an automobile after its completion by the manufacturer.

In Figs. 4 and 5 I have shown a slightly modified form of the invention. The general structure is similar to that shown in Fig. 3 but in the form shown in these figures the fixed stem 6 is provided with a pair of spaced apart lugs 21 in which is journaled a roller 22. The movable stem or hanger 9, instead of being provided with a roller, is provided with an elongated flat contact surface 23 with which the roller 22 engages, this surface being located at the lower end of the hanger, substantially as shown. The lower end of the hanger below the elongated contact surface is provided with an outwardly extending hook portion 24 which coöperates with the roller and lugs 21 and a buffer 25 to limit the movement of the parts of the shock absorber relatively to each other. As in the form shown in Fig. 3 the lower end of the stem shown in Fig. 4 is also provided with a link 26 to which one end of a leaf spring is attached. The form shown in Figs. 4 and 5 is adaptable for use with the front or rear axle of an automobile.

It will, therefore, be seen that I have provided an arrangement in which the strain is evenly distributed upon the relatively movable members of the shock absorber and in which the parts will move readily relatively to each other. The action of the leaf spring tends to hold the lower ends of the hanger members 9 closely in contact with the adjacent members 6.

While I have shown and described one embodiment of my invention and a modification thereof, it will be understood that the same has been chosen for the purposes of illustration, and that I do not desire to be limited to the details of construction shown and described, for obvious modifications will occur to a person skilled in the art.

The term "stanchion" refers generally to the parts indicated by the numerals 6 and 7.

Having thus fully described my invention, what I claim as new and desire to secure by Letters Patent, is:—

1. In a shock absorber, a stanchion, a hanger movable relatively thereto without binding, a resilient medium interposed between the stanchion and hanger, means attached to the hanger which tends to displace the same relatively to said stanchion, and guiding devices arranged to counteract said displacing tendency and to maintain the hanger and stanchion in equidistant relation to prevent binding of the parts during the relative movement thereof.

2. In a shock absorber, a stanchion, a hanger movable relatively thereto, a resilient medium interposed between the stanchion and hanger, a spring attached to said hanger, and guiding devices to take up the thrust of said spring and to maintain the stanchion and hanger in equidistant relation to prevent binding of the parts during the relative movement thereof.

3. In a shock absorber, a stanchion, a hanger movable relatively thereto, a resilient medium interposed between the stanchion and hanger, a spring attached to said hanger at one side of a portion thereof, and guiding devices at the opposite side of the same portion to take up the thrust of said spring and maintain the stanchion and hanger in equidistant relation to prevent binding of the parts during the relative movement thereof.

4. In a shock absorber, a stanchion provided with an abutment, a hanger movable relatively to said stanchion provided with an abutment above the first-mentioned one and having its lower end projecting below the same, a resilient medium disposed between said abutments, and coöperating guiding devices on the portion of said hanger below the first-mentioned abutment to maintain the stanchion and hanger in equidistant relation.

5. In a shock absorber, a stanchion provided with an abutment, a hanger movable relatively to said stanchion provided with an abutment above the first-mentioned one and having its lower end projecting below the same, a resilient medium disposed between said abutments, a spring attached to the projecting end of said hanger and coöperating guiding devices upon said projecting end below said first-mentioned abutment for performing the dual function of taking up the lateral thrust of said spring and maintaining the hanger in equidistant relation to the stanchion so that the binding of the parts is prevented.

6. In a shock absorber, a stanchion, a hanger movable relatively to said stanchion, a resilient medium disposed between the stanchion and hanger, means attached to the hanger which tends to displace the same relatively to said stanchion, guiding devices arranged to counteract said displacing tendency and to maintain the hanger and stanchion in proper relation to prevent binding of the parts during the relative movement thereof, and means associated with said guiding devices to limit the relative movement of the parts.

7. In a shock absorber, a stanchion, a hanger movable relatively to said stanchion, and a resilient medium disposed between the stanchion and hanger, said stanchion and hanger being provided with a guideway and roller coöperating with each other, whereby the hanger moves relatively to said stanchion but always equidistant therefrom.

8. In a shock absorber, a stanchion, a hanger movable relatively to said stanchion, a resilient medium disposed between the stanchion and the hanger, a guideway on said stanchion, a roller carried by said hanger adapted to travel in the guideway, whereby the hanger moves relatively to said stanchion but always equidistant from the walls thereof.

9. In a shock absorber, a stanchion provided with an abutment, an opening in said abutment, a hanger provided with an abutment, said hanger extending loosely through said opening and movable relatively to said stanchion, a resilient medium disposed between said abutments, a roller on said hanger below said first-mentioned abutment, slotted guideways between which said roller operates, a guideway on said stanchion with which said roller engages, and devices on the lower end of said hanger coöperating with said slotted guideways.

10. In a shock absorber, a stanchion, a hanger movable relatively to said stanchion without binding, a resilient medium disposed between the stanchion and hanger, a spring attached to said hanger on one side of the axis thereof, and guiding devices comprising a fixed guideway and a roller upon the opposite side of the axis of said hanger and arranged to take up the lateral thrust of said spring and to properly guide the hanger relatively to said stanchion to prevent the binding of the parts.

In testimony whereof, I affix my signature.

OLIVER P. EDWARDS.

Copies of this patent may be obtained for five cents each, by addressing the "Commissioner of Patents, Washington, D. C."